(12) United States Patent
Wang et al.

(10) Patent No.: US 10,578,906 B2
(45) Date of Patent: Mar. 3, 2020

(54) DISPLAY CONTROL METHOD AND DISPLAY DEVICE

(71) Applicants: BOE Technology Group Co., Ltd., Beijing (CN); Hefei BOE Optoelectronics Technology Co., Ltd., Anhui (CN)

(72) Inventors: Xiujuan Wang, Beijing (CN); Xianjie Shao, Beijing (CN); Pengcheng Mu, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 16/048,690

(22) Filed: Jul. 30, 2018

(65) Prior Publication Data

US 2019/0094605 A1    Mar. 28, 2019

(30) Foreign Application Priority Data

Sep. 27, 2017 (CN) .......................... 2017 1 0890309

(51) Int. Cl.
*G02F 1/1335* (2006.01)
*G02F 1/1362* (2006.01)
(Continued)

(52) U.S. Cl.
CPC .... *G02F 1/133512* (2013.01); *G02F 1/13439* (2013.01); *G02F 1/13452* (2013.01);
(Continued)

(58) Field of Classification Search
CPC ......... G02F 1/133512; G02F 1/133514; G02F 1/136286; G02F 1/13439; G02F 1/13452;
(Continued)

(56) References Cited

U.S. PATENT DOCUMENTS

| | | | | |
|---|---|---|---|---|
| 2002/0057412 A1* | 5/2002 | Ashizawa | ......... | G02F 1/134363 349/143 |
| 2008/0024711 A1* | 1/2008 | Yanagawa | ......... | G02F 1/133707 349/143 |
| 2016/0293126 A1* | 10/2016 | Uemura | ............... | G09G 3/3677 |

FOREIGN PATENT DOCUMENTS

| | | |
|---|---|---|
| CN | 102262319 A | 11/2011 |
| CN | 104166257 A | 11/2014 |

(Continued)

OTHER PUBLICATIONS

First Office Action dated Oct. 30, 2019 corresponding to Chinese application No. 201710890309.6.

*Primary Examiner* — Rodney Amadiz
(74) *Attorney, Agent, or Firm* — Nath, Goldberg & Meyer; Joshua B. Goldberg; Stephanie Majkut

(57) ABSTRACT

The present disclosure provides a display control method for a display panel and a display device. The display panel includes an array substrate and an opposite substrate, wherein the array substrate is provided with data lines, scan lines and pixel units arranged in an array, the opposite substrate includes a black matrix, and the method includes: inputting an alternating current signal to the black matrix so as to form an alternating electric field between the black matrix and the array substrate, so that impurity ions between the array substrate and the opposite substrate are in a motion state under an action of the alternating electric field, rather than being adsorbed on the array substrate and the opposite substrate.

16 Claims, 3 Drawing Sheets

(51) Int. Cl.
*G09G 3/36* (2006.01)
*G02F 1/1345* (2006.01)
*G02F 1/1343* (2006.01)

(52) U.S. Cl.
CPC .. *G02F 1/133514* (2013.01); *G02F 1/136286* (2013.01); *G09G 3/3648* (2013.01); *G09G 2320/0219* (2013.01); *G09G 2320/0257* (2013.01)

(58) Field of Classification Search
CPC ......... G09G 3/3648; G09G 2320/0219; G09G 2320/0257
See application file for complete search history.

(56) References Cited

FOREIGN PATENT DOCUMENTS

| | | |
|---|---|---|
| CN | 104517583 A | 4/2015 |
| CN | 104793413 A | 7/2015 |
| CN | 104834132 A | 8/2015 |
| CN | 105044971 A | 11/2015 |
| CN | 105739806 A | 7/2016 |
| CN | 106353906 A | 1/2017 |

\* cited by examiner

DISPLAY CONTROL METHOD AND DISPLAY DEVICE

CROSS-REFERENCE TO RELATED APPLICATION

The present application claims priority to Chinese Patent Application No. 201710890309.6, filed on Sep. 27, 2017, the disclosure of which is hereby incorporated by reference.

TECHNICAL FIELD

The present disclosure relates to the field of display technology, and in particular, to a display control method and a display device.

BACKGROUND

In a liquid crystal display product, both a pixel electrode and a common electrode are provided on a TFT (Thin Film Transistor) substrate side, and liquid crystal molecules are deflected in a horizontal direction to display an image.

SUMMARY

An embodiment provides a display control method for a display panel, the display panel including an array substrate and an opposite substrate, wherein the array substrate being provided with data lines, scan lines and pixel units arranged in an array, the opposite substrate includes a black matrix, the method includes: inputting an alternating current signal to the black matrix to form an alternating electric field between the black matrix and the array substrate, so that impurity ions between the array substrate and the opposite substrate are in a motion state under an action of the alternating electric field.

In some implementations, a voltage of the alternating current signal is greater than a first voltage difference and less than a second voltage difference, wherein the first voltage difference is a difference between a maximum feed-through voltage and a minimum feed-through voltage, the second voltage difference is a difference between a data line voltage and the first voltage difference, and wherein the feed-through voltage is a voltage generated on a pixel electrode in a pixel unit, the data line voltage is one-third of a maximum voltage loaded on the data line.

In some implementations, a frequency of the alternating current signal is not less than twice a frequency of a driving signal loaded on the data line.

In some implementations, a waveform of the alternating current signal is one of a square wave, a triangular wave and a sine wave.

In some implementations, the step of inputting the alternating current signal to the black matrix includes: inputting the alternating current signal to the black matrix through a flexible circuit board connected to the display panel, wherein control parameters of the alternating current signal are preset in the flexible circuit board.

In some implementations, the step of inputting the alternating signal to the black matrix includes: inputting the alternating current signal to the black matrix through an integrated circuit connected to the display panel, wherein control parameters of the alternating current signal are preset in the integrated circuit.

In some implementations, the opposite substrate is a color filter substrate.

An embodiment provides a display device including a display panel and a peripheral control circuit, the display panel including an array substrate and an opposite substrate, wherein the array substrate is provided with data lines, scan lines and pixel units arranged in an array, the opposite substrate includes a black matrix, the peripheral control circuit is electrically connected to the black matrix; the peripheral control circuit inputs an alternating current signal to the black matrix so as to form an alternating electric field between the black matrix and the array substrate, so that impurity ions between the array substrate and the opposite substrate are in a motion state under an action of the alternating electric field.

In some implementations, the black matrix has a sheet resistance ranging from $10^6 \Omega/\square$ to $10^7 \Omega/\square$.

In some implementations, the peripheral control circuit includes a flexible circuit board electrically connected to the black matrix, and control parameters of the alternating current signal are preset in the flexible circuit board.

In some implementations, the peripheral control circuit includes an integrated circuit, the integrated circuit is electrically connected to the black matrix, and control parameters of the alternating current signal are preset in the integrated circuit.

In some implementations, the peripheral control circuit is connected to the black matrix through a silver wire.

In some implementations, the peripheral control circuit is provided on the array substrate, and the array substrate is further provided with a first electrode, wherein the peripheral control circuit is electrically connected to the black matrix through the first electrode.

In some implementations, the first electrode is connected to the black matrix through a silver wire.

In some implementations, the first electrode is a transparent electrode.

In some implementations, the first electrode is an ITO electrode.

In some implementations, the opposite substrate is a color filter substrate.

DETAILED DESCRIPTION

The present disclosure will be further described in detail below with reference to accompanying drawings and specific embodiments.

During a process for driving a liquid crystal display product, a feed-through voltage is generated on a pixel electrode due to a parasitic capacitance Cgs between a gate and a source of a TFT, and the feed-through voltage forms a direct current bias voltage in a liquid crystal panel. Under an action of the direct current bias voltage, impurity ions in a liquid crystal cell are attracted to the pixel electrode and a common electrode on a TFT substrate side and an alignment film on an opposite substrate (e.g., a CF (Color Filter) substrate) side. As the impurity ions being accumulated, the direct current bias voltage gradually increases, resulting in a residual image defect in the liquid crystal display product, thereby affecting the display effect.

Figure 1:
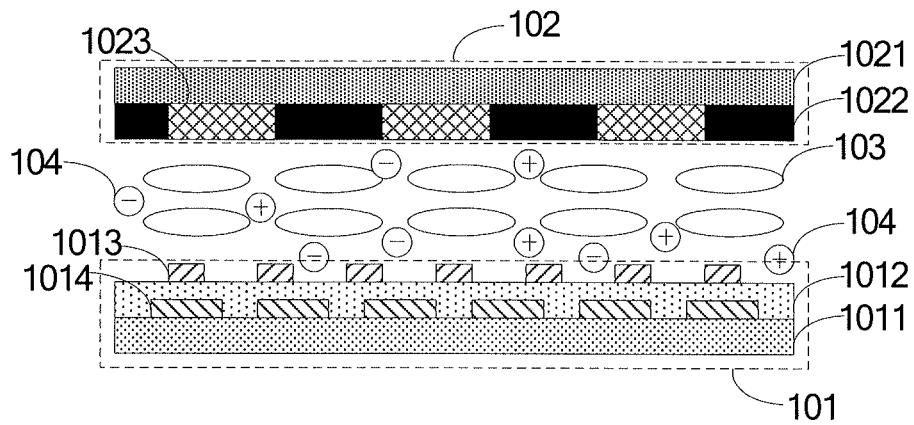
FIG. 1 is a schematic structural diagram of a display panel according to an embodiment of the present disclosure.

An embodiment of the present disclosure provides a display control method for a display panel. As shown in FIG. 1, the display panel includes an array substrate 101 and an opposite substrate 102. The array substrate 101 is provided with data lines, scan lines and pixel units arranged in an array thereon. The opposite substrate 102 includes a black matrix (BM) 1022.

In this embodiment, the display panel includes the array substrate 101 and the opposite substrate 102 which are aligned and assembled into a cell. The array substrate 101 includes an array glass plate 1011, a protective layer 1012, a common electrode 1013, and a pixel electrode 1014. The opposite substrate 102 includes an opposite glass plate 1021, a black matrix 1022, and a color filter layer 1023. In the present embodiment, since the opposite substrate 102 is provided with the color filter layer 1023, the opposite substrate 102 may also be referred to as a color filter substrate, but this is only an example and the present disclosure is not limited thereto. Between the array substrate 101 and the opposite substrate 102, liquid crystal molecules 103 are filled and some impurity ions 104 are also present.

Figure 2:
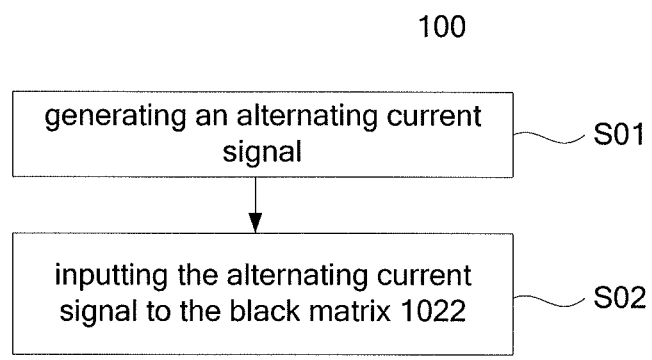
FIG. 2 is a flow chart showing a display control method of an embodiment of the present disclosure.

As shown in FIG. 2, the display control method 100 includes steps of: S01, generating an alternating current signal; S02, inputting the alternating current signal to the black matrix 1022, so as to form an alternating electric field between the black matrix 1022 and the array substrate 101 so that impurity ions 104 between the array substrate 101 and the opposite substrate 102 are in a motion state under an action of the alternating electric field.

In this embodiment, before the alternating current signal is input to the black matrix 1022, the impurity ions 104 in the display panel may be adsorbed on the array substrate 101 and the opposite substrate 102 of the display panel, after the alternating current signal is input to the black matrix 1022, the black matrix 1022 is slightly charged by the alternating current signal, the phase of the alternating current signal changes alternately, and an alternating electric field is formed between the black matrix 1022 and the array substrate 101. For example, the alternating current signal is applied between the black matrix 1022 and the common electrode 1013 of the array substrate 101, therefore an alternating electric field is formed between the black matrix 1022 and the array substrate 101. The impurity ions 104 between the array substrate 101 and the opposite substrate 102 include positively charged ions and negatively charged ions. In a case where the black matrix 1022 is positively charged, the positively charged ions move in a direction away from the black matrix 1022 under the action of the electric field, and the negatively charged ions move toward the black matrix 1022 under the action of the electric field. In a case where the black matrix is negatively charged, the positively charged ions move toward the black matrix 1022 under the action of the electric field, and the negatively charged ions move in a direction away from the black matrix 1022 under the action of the electric field. The impurity ions 104 are in a motion state under the action of the alternating electric field, so that they cannot be adsorbed on the array substrate 101 and the opposite substrate 102, avoiding an increase of a direct-current bias voltage caused by the adsorption of the impurity ions 104 on the array substrate 101 and the opposite substrate 102, and thus avoiding the residual image defect caused by the increase of the direct-current bias voltage, and the display effect is finally improved. In some embodiments, when the pixel unit is charged by the data line, the alternating current signal is input to the black matrix 1022, i.e., the impurity ions are in a motion state while the pixel unit is operating.

In some embodiments in the present disclosure, the alternating current signal is input to the black matrix 1022 through an FPC (Flexible Printed Circuit) or an IC (Integrated Circuit) connected to the display panel, control parameters of the alternating current signal are preset in the FPC or the IC.

In this embodiment, the FPC or the IC may be connected to the display panel, which is not limited in detail in the embodiments of the present disclosure, and may be set according to actual conditions. The control parameters of the alternating current signal are preset in the FPC or the IC, the alternating current signal is generated by the FPC or the IC and is input to the black matrix 1022.

In some embodiments of the present disclosure, the alternating current signal has a preset voltage and a preset frequency.

In this embodiment, the alternating current signal input to the black matrix 1022 needs to have the preset voltage and the preset frequency. Specifically, the preset voltage is greater than a first voltage difference and less than a second voltage difference. The first voltage difference is a difference between a maximum feed-through voltage and a minimum feed-through voltage, and the second voltage difference is a difference between a data line voltage and the first voltage difference. The feed-through voltage is a voltage generated on a pixel electrode 1014 in the pixel unit, and the data line voltage is one-third of a maximum voltage loaded on the data line.

Figure 3:
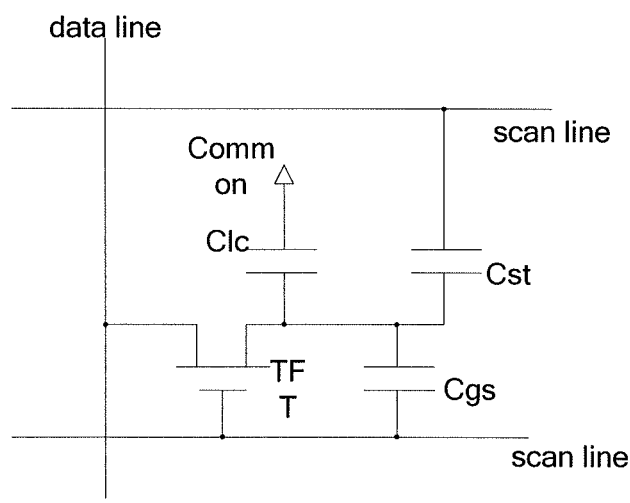
FIG. 3 is a diagram showing an equivalent circuit of a TFT according to an embodiment of the present disclosure.

In the array substrate, the TFT is used to control on and off of the pixel unit, and a feed-through voltage may be generated on the pixel electrode 1014 due to the parasitic capacitance Cgs between the gate and the source of the TFT. Referring to the equivalent circuit diagram of the TFT shown in FIG. 3, the feed-through voltage $\Delta Vp=Cgs(VGH-VGL)/(Cgs+Clc+Cst)$, where Cgs is the parasitic capacitance between the gate and the source of the TFT, Clc is a panel capacitance, and Cst is a parasitic capacitance between the gate of the TFT and the scan line, VGH is a high level, and VGL is a low level. The maximum feed-through voltage is $\Delta Vpmax=Cgs(VGH-VGL)/(Cgs+Clc+Cst)min$, and the minimum feed-through voltage is $\Delta Vpmin=Cgs(VGH-VGL)/(Cgs+Clc+Cst)max$, then, the first voltage difference is the difference between the maximum feed-through voltage $\Delta Vpmax$ and the minimum feed-through voltage $\Delta Vpmin$. For example, Cgs=4.67 fF, (Clc+Cst)min=67.24 fF, (Clc+Cst)max=80.33 fF, VGH=15V, VGL=−12V, $\Delta Vpmax=Cgs(VGH-VGL)/(Cgs+Clc+Cst)min=1.505V$, $\Delta Vpmin=Cgs(VGH-VGL)/(Cgs+Clc+Cst)max=1.268V$, $\Delta Vpmax-\Delta Vpmin=0.237V$. The data line voltage is one-third of the maximum voltage Vdatamax loaded on the data line. The second voltage difference is the difference between the data line voltage Vdatamax/3 and the first voltage difference $\Delta Vpmax-\Delta Vpmin$.

The preset voltage is greater than the first voltage difference to ensure that the impurity ions 104 can still move between the array substrate 101 and the opposite substrate 102 when the direction of the alternating current signal is opposite to the direction of the direct current bias voltage. The preset voltage is less than the second voltage difference to avoid deflection of the liquid crystal molecules 103 in the display panel. The preset frequency is not less than twice the driving frequency of the driving signal loaded on the data line, so that the phase reversal frequency of the alternating current signal can ensure that a time during which the impurity ions 104 stay on the display panel is much shorter than the response time of the liquid crystal molecules 103.

In some embodiments of the present disclosure, a waveform of the alternating current signal is any of a square wave, a triangular wave, and a sine wave.

Figure 4:
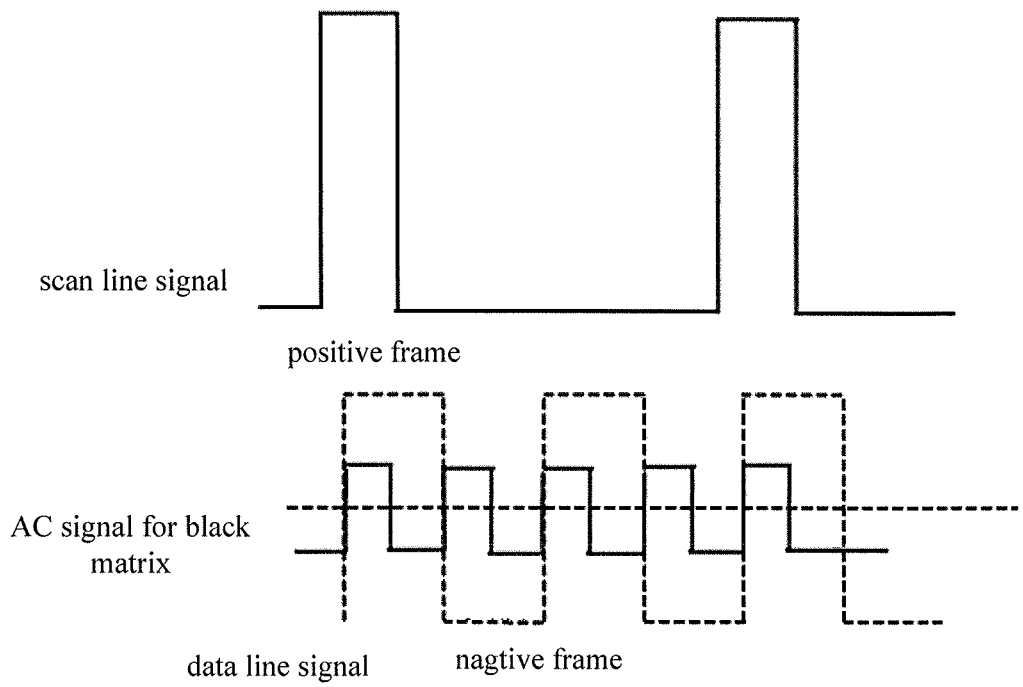
FIG. 4 shows a signal waveform input to a display panel according to an embodiment of the present disclosure.
Figure 5:
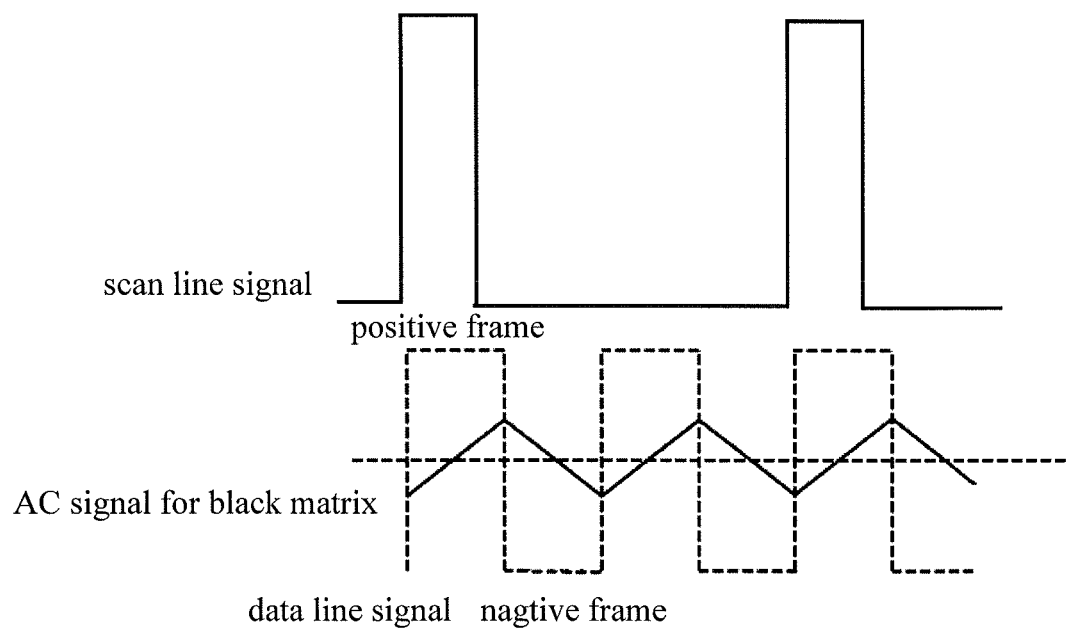
FIG. 5 shows another signal waveform input to a display panel according to an embodiment of the present disclosure.

In this embodiment, the waveform of the alternating current signal may be a square wave, such as the waveform of the signal input to the display panel as shown in FIG. 4, or may be a triangular wave, such as the waveform of the signal input to the display panel as shown in FIG. 5, or may be a sine wave, which is not limited in the embodiment of the present disclosure, and may be set according to actual conditions.

In summary, in the embodiment of the present disclosure, an alternating current signal is input to the black matrix, and an alternating electric field is formed between the black matrix and the array substrate, so that the impurity ions between the array substrate and the opposite substrate are in a motion state under the action of the alternating electric field, rather than being adsorbed on the array substrate and the opposite substrate, avoiding an increase of the direct current bias voltage due to the accumulation of the impurity ions, thereby avoiding the residual image defect caused by the increase of the direct current bias voltage, and improving the display effect.

Figure 6:
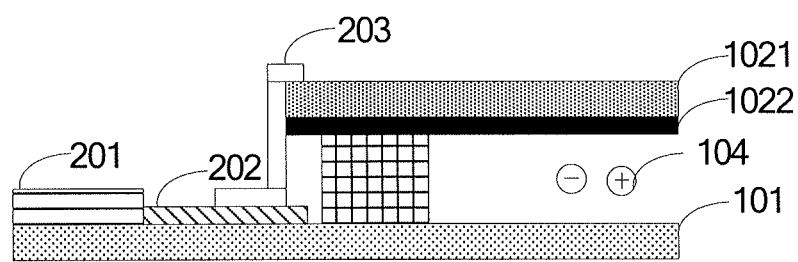
FIG. 6 is a structural diagram of a display device according to an embodiment of the present disclosure.

Referring to FIG. 6, a display device provided by an embodiment of the present disclosure is illustrated. The display device includes a display panel and a peripheral control circuit 201 for the display panel. The display panel includes an array substrate 101 and an opposite substrate 102. The array substrate 101 is provided with data lines, scan lines and pixel units arranged in an array. The opposite substrate 102 includes a black matrix 1022, and the peripheral control circuit 201 is electrically connected to the black matrix 1022.

The peripheral control circuit 201 inputs an alternating current signal to the black matrix 1022 so as to form an alternating electric field between the black matrix 1022 and the array substrate 101, so that the impurity ions between the array substrate 101 and the opposite substrate 102 are in a motion state under the action of the alternating electric field.

In this embodiment, the signal input to the black matrix 1022 is an alternating current signal, the alternating current signal causes the black matrix 1022 to be slightly charged, and the phase of the alternating current signal changes alternately, an alternating electric field is formed between the black matrix 1022 and the array substrate 101, and the impurity ions 104 in the display panel are in a motion state under the action of the alternating electric field and cannot be adsorbed on the array substrate 101 and the opposite substrate 102, thereby avoiding an increase of the direct current bias voltage due to accumulation of the impurity ions 104 on the array substrate 101 and the opposite substrate 102, thus avoiding the residual image defect caused by the increase of the direct current bias voltage, and the display effect is finally improved.

In some embodiments of the present disclosure, the black matrix may have a sheet resistance ranging from $10^6 \Omega/\square$ to $10^7 \Omega/\square$, and the low-resistance black matrix can avoid an attenuation of the alternating current signal.

In some embodiments of the present disclosure, a FPC of the peripheral control circuit 201 is electrically connected to the black matrix 1022, and control parameters of the alternating current signal are preset in the FPC.

Alternatively, an IC of the peripheral control circuit 201 is electrically connected to the black matrix 1022, and the control parameters of the alternating current signal are preset in the IC.

In this embodiment, referring to the display device shown in FIG. 6, the peripheral control circuit 201 is connected to the black matrix 1022, and the peripheral control circuit 201 may include the FPC or the IC, which is not limited in the embodiment of the present disclosure, and may be selected according to actual conditions. The control parameters of the alternating current signal are preset in the FPC or the IC, and the FPC or the IC generates an alternating current signal according to the control parameters, and inputs the alternating current signal to the black matrix 1022 through a connection line.

In some embodiments of the present disclosure, the peripheral control circuit 201 is connected to the black matrix 1022 through a silver wire.

In this embodiment, the FPC or the IC of the peripheral control circuit 201 may be provided on the array substrate 101, and connected to the black matrix 1022 through an ITO electrode 202 and the connection line 203 provided on the array substrate, wherein the connection line 203 may be a silver wire.

In summary, in the embodiment of the present disclosure, the display device includes a display panel including an array substrate and an opposite substrate, wherein the array substrate is provided with data lines, scan lines and pixel units arranged in an array, and the opposite substrate includes a black matrix. The peripheral control circuit is electrically connected to the black matrix, and inputs an alternating current signal to the black matrix so as to form an alternating electric field between the black matrix and the array substrate, so that the impurity ions between the array substrate and the opposite substrate are in a motion state under the action of the alternating electric field, rather than being adsorbed on the array substrate and the opposite substrate, avoiding an increase of the direct current bias voltage due to the accumulation of the impurity ions, thereby avoiding the residual image defect caused by the increase of the direct current bias voltage, therefore the display effect is improved.

The various embodiments in the present specification are described in a progressive manner, and each embodiment focuses on differences from other embodiments, and the same or similar parts among the various embodiments can be referred to each other.

Finally, it should be noted that, in this context, relational terms such as first and second are merely used to distinguish one entity or operation from another entity or operation, and do not necessarily require or imply that any such actual relationship or order exists between these entities or operations. Furthermore, the terms "comprise", "include" or any other variations thereof are intended to cover non-exclusive inclusion, such that a process, method, product, or equipment including a series of elements includes not only these elements, but also other elements not being definitely listed, or further includes elements inherent to such process, method, product or equipment. Without additional limitations, element that is defined by the phrase "comprising/including a . . . " does not exclude the presence of additional elements in the process, method, product, or equipment which includes the element.

The above is a detailed description of a display control method and a display device provided by the present disclosure. The principles and embodiments of the present disclosure are described herein by using specific examples.

The description of the above embodiments is only for helping to understand the method and core idea of the present disclosure. Meanwhile, those skilled in the art may change the specific implementations and the field of application according to the idea of the present disclosure. In summary, the content of the specification should not be understood as limitation to the disclosure.

The invention claimed is:

1. A display control method for a display panel, the display panel comprising an array substrate and an opposite substrate, wherein the array substrate is provided with data lines, scan lines and pixel units arranged in an array, the opposite substrate comprises a black matrix, the method comprising:

inputting an alternating current signal to the black matrix to form an alternating electric field between the black matrix and the array substrate, so that impurity ions between the array substrate and the opposite substrate are in a motion state under an action of the alternating electric field, wherein a frequency of the alternating current signal is not less than twice a frequency of a driving signal loaded on the data line.

2. The method of claim 1, wherein a voltage of the alternating current signal is greater than a first voltage difference and less than a second voltage difference, wherein the first voltage difference is a difference between a maximum feed-through voltage and a minimum feed-through voltage, the second voltage difference is a difference between a data line voltage and the first voltage difference, and wherein the feed-through voltage is a voltage generated on a pixel electrode in a pixel unit, the data line voltage is one-third of a maximum voltage loaded on the data line.

3. The method of claim 1, wherein a waveform of the alternating current signal is any of a square wave, a triangular wave and a sine wave.

4. The method of claim 1, wherein the step of inputting the alternating current signal to the black matrix comprises:

inputting the alternating current signal to the black matrix through a flexible circuit board connected to the display panel, wherein control parameters of the alternating current signal are preset in the flexible circuit board.

5. The method of claim 1, wherein the step of inputting the alternating signal to the black matrix comprises:

inputting the alternating current signal to the black matrix through an integrated circuit connected to the display panel, wherein control parameters of the alternating current signal are preset in the integrated circuit.

6. The method of claim 1, wherein the opposite substrate is a color filter substrate.

7. A display device, comprising a display panel and a peripheral control circuit, the display panel comprising an array substrate and an opposite substrate, wherein the array substrate is provided with data lines, scan lines and pixel units arranged in an array, the opposite substrate comprises a black matrix, the peripheral control circuit is electrically connected to the black matrix;

the peripheral control circuit inputs an alternating current signal to the black matrix so as to form an alternating electric field between the black matrix and the array substrate, so that impurity ions between the array substrate and the opposite substrate are in a motion state under an action of the alternating electric field, wherein the peripheral control circuit is provided on the array substrate, and the array substrate is further provided with a first electrode, wherein the peripheral control circuit is electrically connected to the black matrix through the first electrode.

8. The display device of claim 7, wherein the black matrix has a sheet resistance ranging from $10^6 \Omega/\square$ to $10^7 \Omega/\square$.

9. The display device of claim 7, wherein the peripheral control circuit comprises a flexible circuit board electrically connected to the black matrix, and control parameters of the alternating current signal are preset in the flexible circuit board.

10. The display device of claim 9, wherein the peripheral control circuit is connected to the black matrix through a silver wire.

11. The display device of claim 7, wherein the peripheral control circuit comprises an integrated circuit, the integrated circuit is electrically connected to the black matrix, and control parameters of the alternating current signal are preset in the integrated circuit.

12. The display device of claim 11, wherein the peripheral control circuit is connected to the black matrix through a silver wire.

13. The display device of claim 7, wherein the first electrode is connected to the black matrix through a silver wire.

14. The display device of claim 7, wherein the first electrode is a transparent electrode.

15. The display device of claim 14, wherein the first electrode is an ITO electrode.

16. The display device of claim 7, wherein the opposite substrate is a color filter substrate.

* * * * *